(12) United States Patent
Feng et al.

(10) Patent No.: US 10,169,386 B2
(45) Date of Patent: Jan. 1, 2019

(54) DEVICES AND METHODS FOR PROCESSING NETWORK NODES

(71) Applicant: Tencent Technology (Shenzhen) Company Limited, Shenzhen (CN)

(72) Inventors: Xiaowei Feng, Shenzhen (CN); Jiaojiao Ren, Shenzhen (CN); Yan Xiong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 923 days.

(21) Appl. No.: 14/592,407

(22) Filed: Jan. 8, 2015

(65) Prior Publication Data

US 2015/0127667 A1    May 7, 2015

Related U.S. Application Data

(63) Continuation of application No. PCT/CN2014/082363, filed on Jul. 17, 2014.

(30) Foreign Application Priority Data

Aug. 15, 2013   (CN) .......................... 2013 1 0356173

(51) Int. Cl.
*G06F 17/30* (2006.01)
*G06F 17/18* (2006.01)
(Continued)

(52) U.S. Cl.
CPC ........ *G06F 17/30324* (2013.01); *G06F 17/16* (2013.01); *G06F 17/18* (2013.01); *G06F 17/30864* (2013.01); *H04L 51/32* (2013.01)

(58) Field of Classification Search
USPC ........................................................ 707/752
See application file for complete search history.

(56) References Cited

U.S. PATENT DOCUMENTS 4,972,363 A * 11/1990 Nguyen ................... G06N 3/04
                                                          700/48
8,180,804 B1    5/2012 Narayanan et al.
(Continued)

FOREIGN PATENT DOCUMENTS

CN        101140588 A    3/2008
CN        101657040 A    2/2010
(Continued)

OTHER PUBLICATIONS

Patent Cooperation Treaty, International Search Report and Written Opinion of the International Searching Authority, dated Oct. 24, 2014, in PCT/CN2014/082363.
(Continued)

*Primary Examiner* — Cheyne D Ly
(74) *Attorney, Agent, or Firm* — Anova Law Group, PLLC

(57) ABSTRACT

Devices and methods are provided for processing network nodes. For example, a sorting request is detected; one or more first network nodes to be sorted are acquired corresponding to the sorting request; a first characteristic matrix is constructed based on at least information associated with the first network nodes; association information between the first network nodes is acquired; a sparse matrix is constructed based on at least information associated with the association information between the first network nodes; iterative multiplication is performed on the sparse matrix and the first characteristic matrix to obtain a second characteristic matrix upon convergence; and the first network nodes are sorted based on at least information associated with the second characteristic matrix.

11 Claims, 9 Drawing Sheets

(51) Int. Cl.
*G06F 17/16* (2006.01)
*H04L 12/58* (2006.01)

(56) References Cited

U.S. PATENT DOCUMENTS

| | | | |
|---|---|---|---|
| 8,751,556 B2* | 6/2014 | Song | G06F 17/10 708/607 |
| 2004/0139340 A1* | 7/2004 | Johnson | G06F 21/14 713/194 |
| 2005/0078765 A1* | 4/2005 | Jeong | H04L 1/0057 375/267 |
| 2008/0025633 A1* | 1/2008 | Szeliski | G06F 17/13 382/274 |
| 2011/0252121 A1 | 10/2011 | Borgs et al. | |
| 2011/0307685 A1* | 12/2011 | Song | G06F 17/10 712/16 |

FOREIGN PATENT DOCUMENTS

| | | |
|---|---|---|
| CN | 102141976 A | 8/2011 |
| CN | 102611713 A | 7/2012 |
| CN | 102880799 A | 1/2013 |
| CN | 103106279 A | 5/2013 |
| WO | 2011156247 A2 | 12/2011 |

OTHER PUBLICATIONS

Patent Cooperation Treaty, International Preliminary Report on Patentability, dated Feb. 16, 2016, in PCT/CN2014/082363.
Kang, U, et al.; "Big Graph Mining: Algorithms and Discoveries;" *SIGKDD Explorations*, 14(2); pp. 29-36; Dec. 2012.
Kang, et al.; "Big Graph Mining: Algorithms and Discoveries"; SIGKDD Explorations; p. 29-34; Dec. 31, 2012. Total 8 pages.
The State Intellectual Property Office of the People's Republic of China (SIPO) Office Action 1 for 201310356173.2 Jul. 23, 2018 8 Pages (including translation).

* cited by examiner

A

| | A | B | C | D | E | F |
|---|---|---|---|---|---|---|
| A | 0 | 0 | 0 | 0 | 1 | 0 |
| B | -2/3 | 0 | -1/6 | 0 | 0 | -1/6 |
| C | 0 | 0 | 0 | 0 | 0 | 0 |
| D | 0 | -1/2 | -1/2 | 0 | 0 | 0 |
| E | 0 | 0 | 0 | 0 | 0 | 0 |
| F | -1/2 | 0 | 0 | 0 | -1/2 | 0 |

Figure 6

DEVICES AND METHODS FOR PROCESSING NETWORK NODES

CROSS-REFERENCES TO RELATED APPLICATIONS

The application is a continuation of International Application No. PCT/CN2014/082363, with an international filing date of Jul. 17, 2014, now pending, which claims priority to Chinese Patent Application No. 201310356173.2, filed Aug. 15, 2013, both applications being incorporated by reference herein for all purposes.

BACKGROUND OF THE INVENTION

Certain embodiments of the present invention are directed to computer technology. More particularly, some embodiments of the invention provide systems and methods for network technology. Merely by way of example, some embodiments of the invention have been applied to network nodes. But it would be recognized that the invention has a much broader range of applicability.

Because of Google, more and more research and applications are performed on PageRank algorithms. At present, PageRank algorithms are widely applied to influence rankings of nodes on a relation network. The present algorithms are implemented using various solutions, such as C/C++ and java, and some algorithms are packaged in business software. However, the conventional technology has some disadvantages. For example, some algorithms cannot implement parallel computing and can only be used for small and medium-sized datasets. Other algorithms are capable of performing parallel computing, but they are difficult to realize and inconvenient to maintain.

Hence it is highly desirable to improve the techniques for processing network nodes.

BRIEF SUMMARY OF THE INVENTION

According to one embodiment, a method is provided for processing network nodes. For example, a sorting request is detected; one or more first network nodes to be sorted are acquired corresponding to the sorting request; a first characteristic matrix is constructed based on at least information associated with the first network nodes; association information between the first network nodes is acquired; a sparse matrix is constructed based on at least information associated with the association information between the first network nodes; iterative multiplication is performed on the sparse matrix and the first characteristic matrix to obtain a second characteristic matrix upon convergence; and the first network nodes are sorted based on at least information associated with the second characteristic matrix.

According to another embodiment, a device for processing network nodes includes: a characteristic matrix constructing module configured to detect a sorting request, acquire one or more first network nodes to be sorted corresponding to the sorting request, and construct a first characteristic matrix based on at least information associated with the first network nodes; a sparse matrix constructing module configured to acquire association information between the first network nodes and construct a sparse matrix based on at least information associated with the association information between the first network nodes; a computing module configured to perform iterative multiplication on the sparse matrix and the first characteristic matrix to obtain a second characteristic matrix upon convergence; and a sorting module configured to sort the first network nodes based on at least information associated with the second characteristic matrix.

According to yet another embodiment, a non-transitory computer readable storage medium includes programming instructions for processing network nodes. The programming instructions are configured to cause one or more data processors to execute certain operations. For example, a sorting request is detected; one or more first network nodes to be sorted are acquired corresponding to the sorting request; a first characteristic matrix is constructed based on at least information associated with the first network nodes; association information between the first network nodes is acquired; a sparse matrix is constructed based on at least information associated with the association information between the first network nodes; iterative multiplication is performed on the sparse matrix and the first characteristic matrix to obtain a second characteristic matrix upon convergence; and the first network nodes are sorted based on at least information associated with the second characteristic matrix.

For example, the devices and methods disclosed herein are realized using general-purpose structured query languages (SQL). As an example, the devices and methods disclosed herein are configured to sort network nodes of a small and medium-sized dataset using a relational database. For example, the devices and methods disclosed herein are configured to sort network nodes of a large or ultra-large dataset using hive and hadoop distributed computing platforms.

Depending upon embodiment, one or more benefits may be achieved. These benefits and various additional objects, features and advantages of the present invention can be fully appreciated with reference to the detailed description and accompanying drawings that follow.

BRIEF DESCRIPTION OF THE DRAWINGS

FIG. 6 is a simplified diagram showing a sparse matrix according to one embodiment of the present invention.

DETAILED DESCRIPTION OF THE INVENTION

Figure 1:
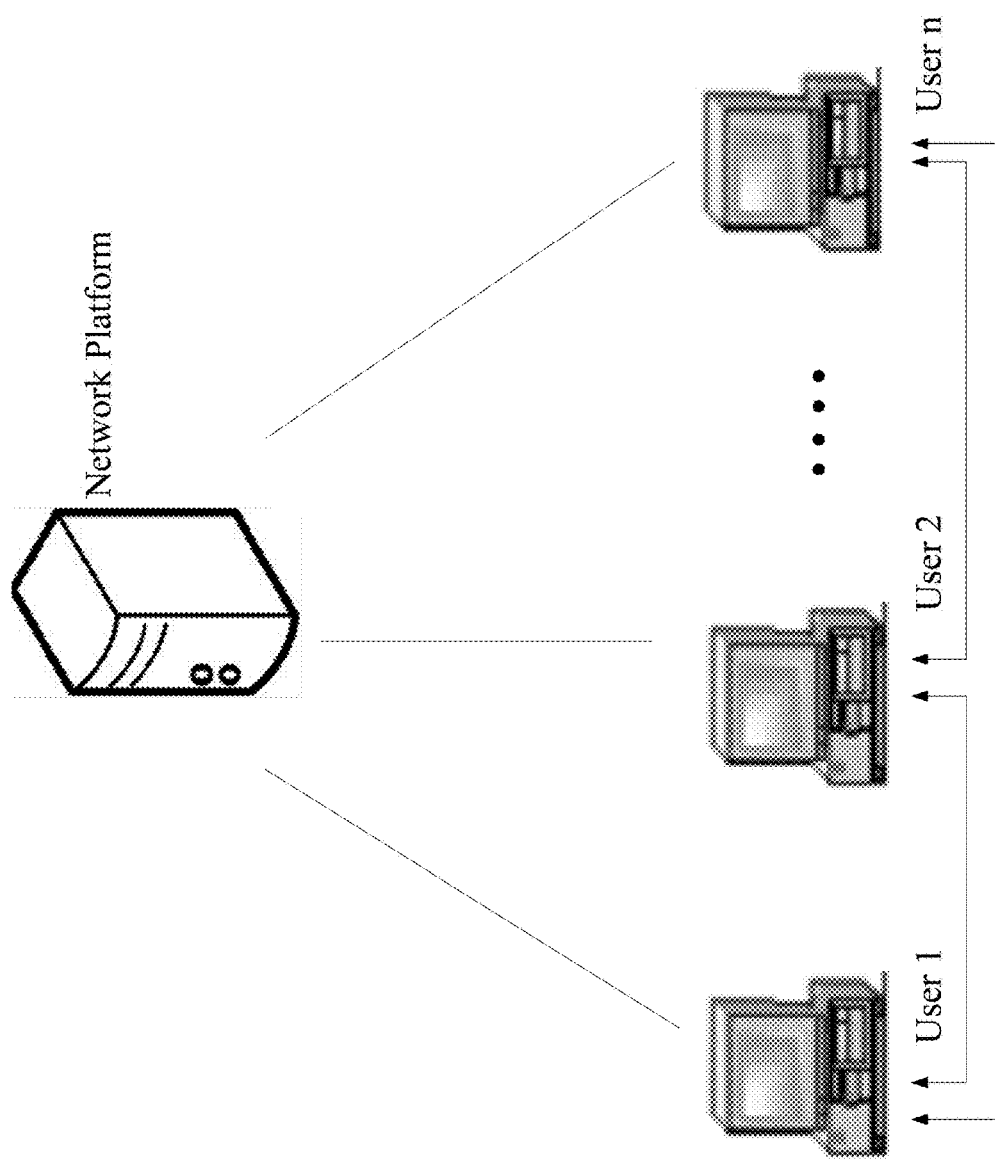
FIG. 1 is a simplified diagram showing a network platform for processing network nodes according to one embodiment of the present invention.

FIG. 1 is a simplified diagram showing a network platform for processing network nodes according to one embodiment of the present invention. The diagram is merely an example, which should not unduly limit the scope of the claims. One of ordinary skill in the art would recognize many variations, alternatives, and modifications.

According to some embodiments, network nodes are processed (e.g., sorted) using various network platforms, such as a micro-blog platform, a player transaction platform of a network game, etc. As shown in FIG. 1, a relation network is established between users via the network platform, and network nodes in the same relation network can be sorted, according to certain embodiments. For example, network nodes of a small and medium-sized dataset can be sorted using a relational database. In another example, network nodes of a large or ultra-large dataset can be sorted using hive and hadoop distributed computing platforms. The network platform corresponds to a micro-blog platform, and relationship among user includes a listening relation and a micro-blog forwarding relation, according to some embodiments.

Figure 2:
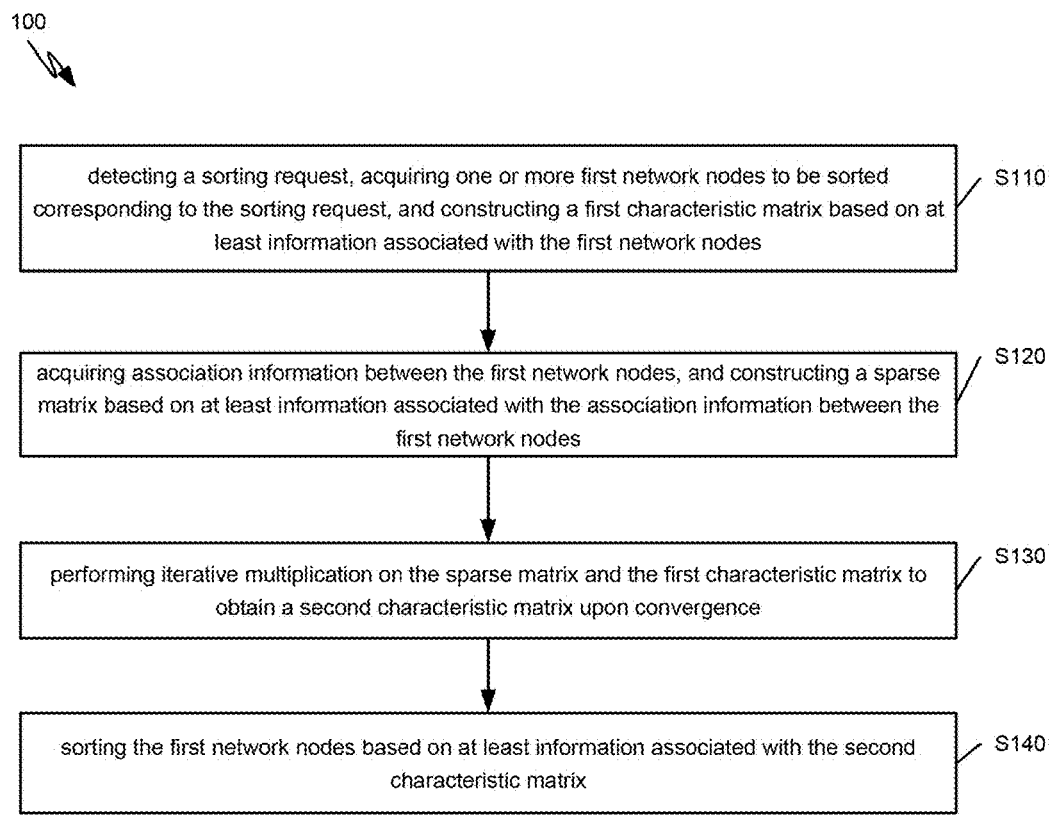
FIG. 2 is a simplified diagram showing a method for processing network nodes according to one embodiment of the present invention.

FIG. 2 is a simplified diagram showing a method for processing network nodes according to one embodiment of the present invention. The diagram is merely an example, which should not unduly limit the scope of the claims. One of ordinary skill in the art would recognize many variations, alternatives, and modifications. The method 100 includes at least processes S110-S140.

According to one embodiment, the process S110 includes: detecting a sorting request, acquiring one or more first network nodes to be sorted corresponding to the sorting request, and constructing a first characteristic matrix based on at least information associated with the first network nodes. For example, the sorting request includes node types of the first network nodes to be sorted. In another example, the sorting request includes user nodes that access a certain network during a preset time period. As an example, when the sorting request is detected, the user nodes that access the network during the preset time period are counted as the first network nodes to be sorted. As another example, the preset time period corresponds to one or more days or one or more hours. As yet another example, the first network nodes to be sorted are acquired to construct a characteristic matrix B which includes an n×1 matrix:

$$\begin{bmatrix} b_{11} \\ b_{21} \\ \ldots \\ b_{n1} \end{bmatrix}$$

where $b_{11}, b_{21}, \ldots, b_{n1}$ correspond to "1/n" and n is a number of the first network nodes.

According to another embodiment, the process S120 includes: acquiring association information between the first network nodes and constructing a sparse matrix based on at least information associated with the association information between the first network nodes. For example, association information between the first network nodes is acquired from a background database of the network. As an example, the user nodes of the micro-blog platform include various relations, such as listening relations, listened relations, and relations associated with forwarding micro-blogs and a number of forwarded micro-blogs. Then the sparse matrix is constructed based on the association information between the first network nodes, according to certain embodiments. For example, the sparse matrix includes an n×n matrix, and element values of the sparse matrix include relational values of the first network nodes which contain one relation. As an example, the listening relations or the listened relations of the first network nodes are counted, or the relations associated with forwarding micro-blogs and a number of forwarded micro-blogs are counted.

According to yet another embodiment, the process S130 includes: performing iterative multiplication on the sparse matrix and the first characteristic matrix to obtain a second characteristic matrix upon convergence. For example, the sparse matrix is multiplied by the characteristic matrix to obtain a new characteristic matrix. Then the sparse matrix multiplies the new characteristic matrix until the characteristic matrix is converged to obtain the second characteristic matrix (e.g., the final characteristic matrix). As an example, characteristic matrix convergence is calculated by determining differences between element values in the new characteristic matrix and element values in a previous characteristic matrix, acquiring a sum of absolute values of the differences and then determining whether the sum of the absolute values of the differences approaches zero. As another example, if the sum of the absolute values of the differences approaches zero, the characteristic matrix has converged. Otherwise, the characteristic matrix has not converged.

In one embodiment, the process S140 includes: sorting the first network nodes based on at least information associated with the second characteristic matrix. For example, after the characteristic matrix has converged, the first network nodes are sorted in a descending order based on the element values of the second characteristic matrix (e.g., the final characteristic matrix). As shown in FIG. 1, the sparse matrix and the characteristic matrix are constructed based on the first network nodes to be sorted, and iterative multiplication computing is carried out on the sparse matrix and the characteristic matrix until the characteristic matrix converges, according to some embodiments. For example, then the first network nodes are sorted based on the element values of the converged characteristic matrix. The method 100 is realized using general-purpose structured query languages, in some embodiments. For example, the sorting of network nodes of a small and medium-sized dataset may be rapidly implemented using a relational database, while the sorting of network nodes of a large or ultra-large dataset may be easily implemented using hive and hadoop distributed computing platforms.

Figure 3:
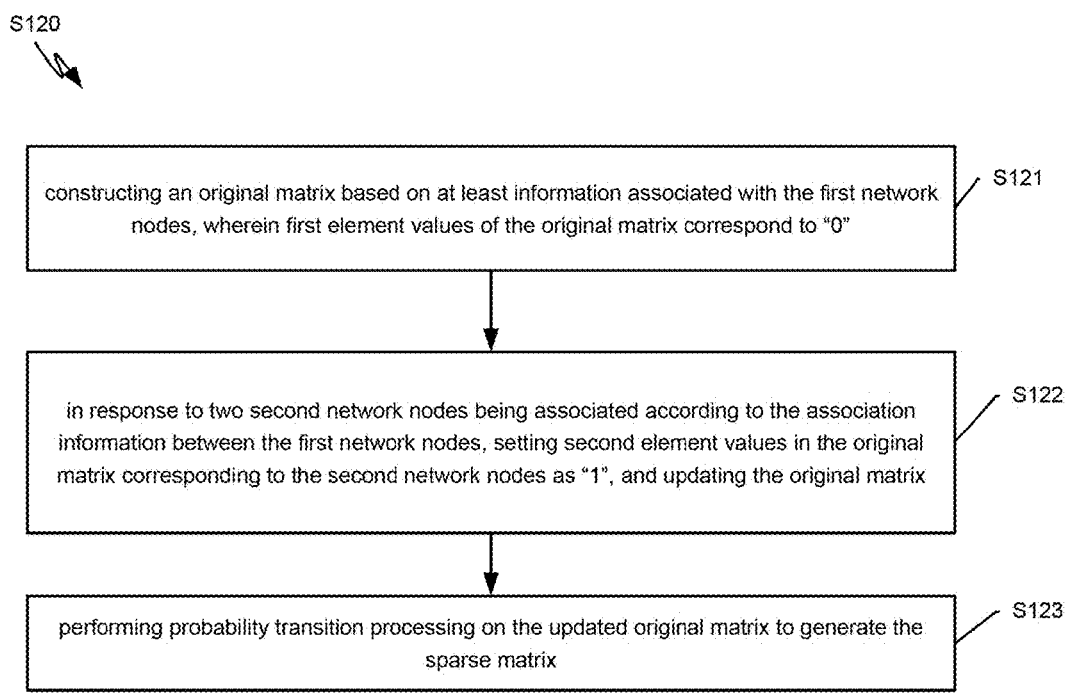
FIG. 3 is a simplified diagram showing a process for constructing a sparse matrix as part of the method as shown in FIG. 2 according to one embodiment of the present invention.

FIG. 3 is a simplified diagram showing a process for constructing a sparse matrix as part of the method as shown in FIG. 2 according to one embodiment of the present invention. The diagram is merely an example, which should not unduly limit the scope of the claims. One of ordinary skill in the art would recognize many variations, alternatives, and modifications. The process S120 includes at least processes S121-S123.

According to one embodiment, the process S121 includes: constructing an original matrix based on at least information associated with the first network nodes, wherein first element values of the original matrix correspond to "0". For example, based on all network nodes, the original matrix is constructed as below:

$$G = \begin{bmatrix} g_{11} & g_{12} & \cdots & g_{1n} \\ g_{21} & g_{22} & \cdots & g_{2n} \\ \cdots & \cdots & \cdots & \cdots \\ g_{n1} & g_{n2} & \cdots & g_{nn} \end{bmatrix} \quad (1)$$

where all element values in the original matrix are "0".

According to another embodiment, the process S122 includes: in response to two second network nodes being associated according to the association information between the first network nodes, setting second element values in the original matrix corresponding to the second network nodes as "1", and updating the original matrix. For example, whether the two second network nodes are associated is determined based on the association information between the first network nodes. As an example, if "listening" and "listened" relations are associated, the element values, corresponding to the second network nodes, in the original matrix are set as "1". As another example, if the "listening" and "listened" relations are not associated, the process S122 is not carried out. In one embodiment, there are 10 network nodes. If a first network node is in a mutual listening relation with a second network node, a fifth network node and an eighth network node respectively, g12, g21, g15, g51, g18 and g81 are all set as "1". If the first network node listens to a third network node and a sixth network node, g31 and g61 are set as "1".

According to yet another embodiment, the process S123 includes: performing probability transition processing on the updated original matrix to generate the sparse matrix. For example, the probability transition processing is performed on the updated original matrix to generate the sparse matrix as follows:

$$G = \begin{bmatrix} g_{11} & g_{12} & \cdots & g_{1n} \\ g_{21} & g_{22} & \cdots & g_{2n} \\ \cdots & \cdots & \cdots & \cdots \\ g_{n1} & g_{n2} & \cdots & g_{nn} \end{bmatrix} \cdots \Rightarrow \cdots A = \begin{bmatrix} a_{11} & a_{12} & \cdots & a_{1n} \\ a_{21} & a_{22} & \cdots & a_{2n} \\ \cdots & \cdots & \cdots & \cdots \\ a_{n1} & a_{n2} & \cdots & a_{nn} \end{bmatrix} \quad (2)$$

where $a_{ij} = \begin{cases} \dfrac{pg_{ij}}{c_j} + \delta & \left(c_j \neq 0, \delta = \dfrac{1-p}{n}\right) \\ \dfrac{1}{n} & (c_j = 0) \end{cases}$.

P represents a classic constant, and $c_j$ represents a stun of elements in a $j^{th}$ column of matrix G.

According to certain embodiments, when $$g_{ij} = 1, a_{ij} = \frac{p}{c_j} + \frac{1-p}{n};$$

when $g_{ij}=0$ and $c_j \neq 0$, $$a_{ij} = \frac{1-p}{n};$$

when $g_{ij}=1$ and $c_j=0$, $$a_{ij} = \frac{1}{n}.$$

According to some embodiments, if $A_I$ corresponds to a set of column numbers of columns that include non-zero values associated with an $i^{th}$ row in the matrix G, D corresponds to a set of column numbers of columns that include $C_j$ of 0 in the matrix G. For example, if iterative multiplication is performed on the sparse matrix A and the characteristic matrix B, the following equation is obtained:

$$b'_{i1} = \sum_{k \in A_I} a_{ik} b_{k1} + \frac{1}{n} \sum_{j \in D} b_{j1} + \frac{1-P}{n}\left(1 - \sum_{j \in D} b_{j1} - \sum_{j \in A_I} b_{k1}\right) \quad (3)$$

According to certain embodiments, when iterative multiplication is performed on the matrix A and the matrix B, Equation 3 is partitioned in three blocks, such as $$\sum_{k \in A_I} a_{ik} b_{k1}, \frac{1}{n} \sum_{j \in D} b_{j1}, \text{ and } \frac{1-P}{n}\left(1 - \sum_{j \in D} b_{j1} - \sum_{j \in A_I} b_{k1}\right),$$

such as which are calculated respectively and are then added. For example, iterative computing is performed by storing the column numbers of the columns having $C_j$ of 0, the row numbers and the column numbers of the original matrix G having element values of 1 and element values in the matrix A after probability transition that correspond to element values of 1 in the original matrix G. Through setting of the above sparse matrix, data can be calculated in blocks when iterative multiplication is performed on the sparse matrix A and the characteristic matrix B, and thus the calculation efficiency is improved, according to certain embodiments. For example, during iterative multiplication, not all data is required to be stored, and thus the storage space is saved.

Figure 4:
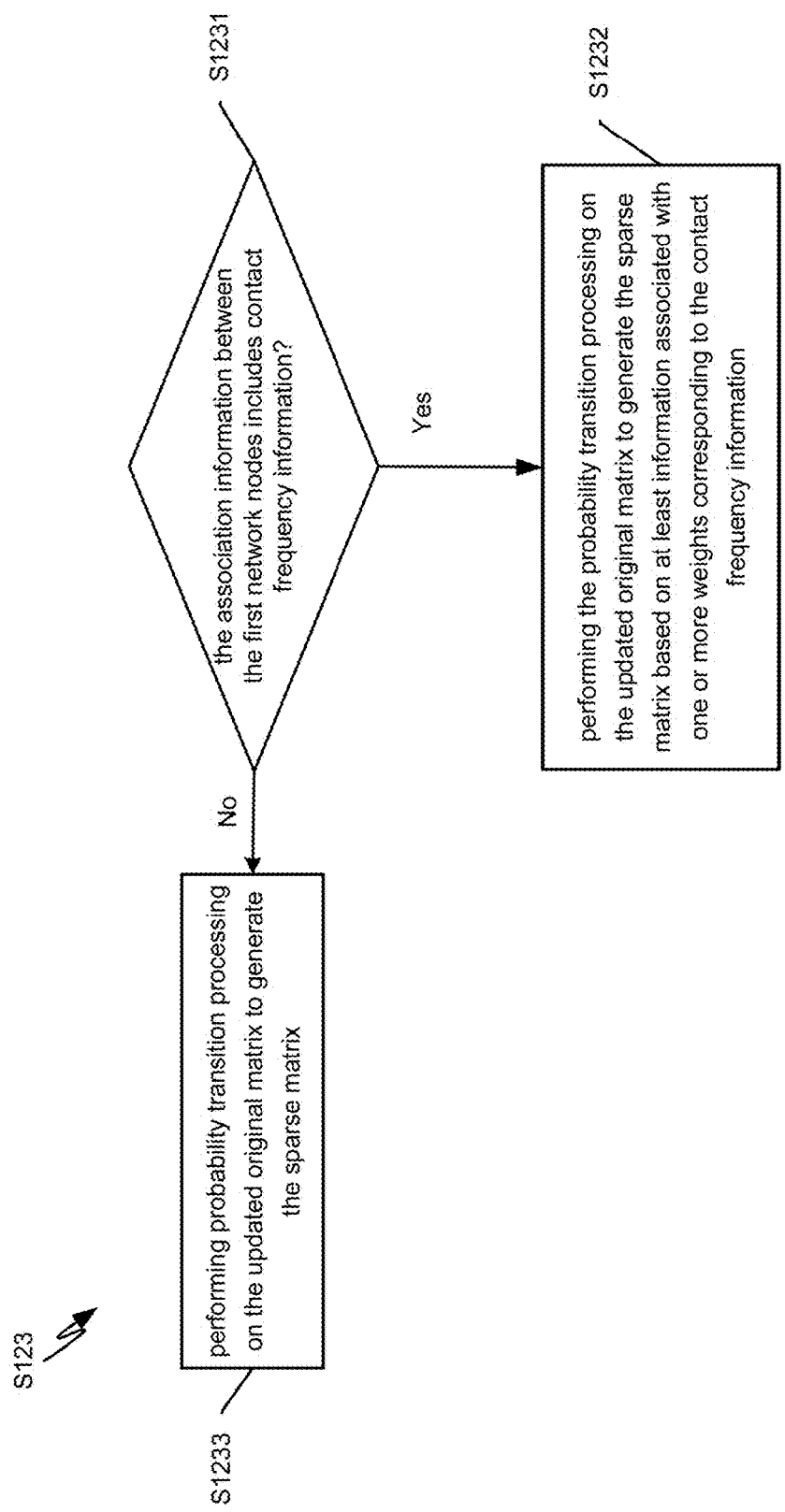
FIG. 4 is a simplified diagram showing a process for performing probability transition processing to generate a sparse matrix as part of the process as shown in FIG. 3 according to one embodiment of the present invention.

FIG. 4 is a simplified diagram showing a process for performing probability transition processing to generate a sparse matrix as part of the process as shown in FIG. 3 according to one embodiment of the present invention. The diagram is merely an example, which should not unduly limit the scope of the claims. One of ordinary skill in the art would recognize many variations, alternatives, and modifications. The process S123 includes at least processes S1231-S1233.

According to one embodiment, during the process S1231, whether contact frequency information is available in the association information between the first network nodes is determined For example, if the contact frequency information is available in the association information between the first network nodes, the process S1232 is executed. Otherwise, the process S1233 is executed. As an example, the association information of the first network nodes includes relation information which has one state, such as the listening relations and the listened relations. As another example, the association information of the first network nodes includes relation information which has multiple states, such as the times of forwarding micro-blogs in a micro-blog forwarding relation. Therefore, when the probability transition processing is performed on the sparse matrix, the contact frequency information is simultaneously considered, according to certain embodiments.

According to another embodiment, the process S1232 includes: performing the probability transition processing on the updated original matrix to generate the sparse matrix based on at least information associated with one or more weights corresponding to the contact frequency information.

For example, if the contact frequency information is available in the association information between the network nodes, the corresponding weight is acquired based on the contact frequency. As an example, the more frequent the network node A forwards micro-blogs of the network node B, the larger the weight of the corresponding element that has a row number of "network node A" and a column number of "network node B". Then the probability transition processing is performed on the updated original matrix based on the acquired weights to generate the sparse matrix, according to certain embodiments.

According to yet another embodiment, during the process S1233, the probability transition processing is directly carried out on the updated original matrix to generate the sparse matrix.

Figures 5A, 5B:
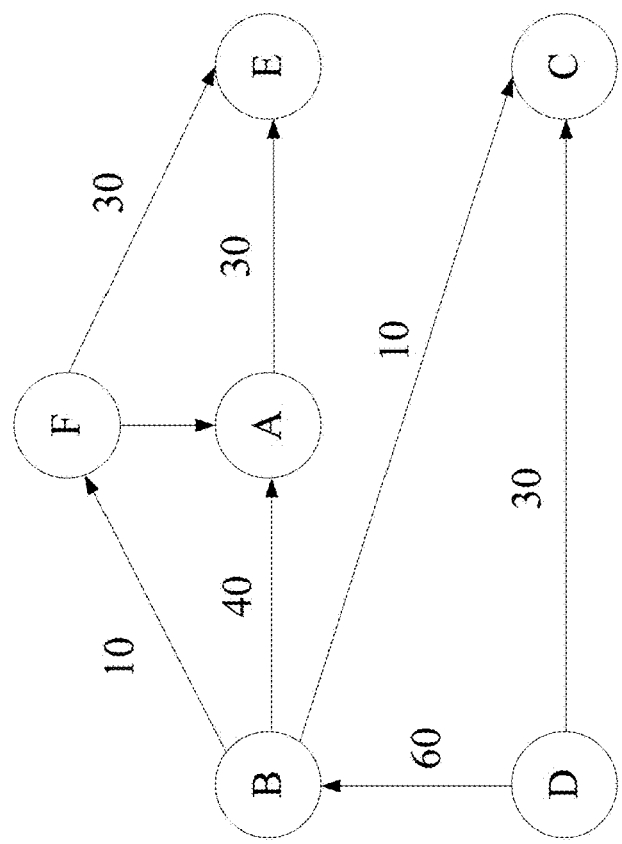
FIG. 5(A) and FIG. 5(B) are simplified diagrams showing an original matrix constructed based on multiple network nodes according to some embodiments of the present invention.

FIG. 5(A) and FIG. 5(B) are simplified diagrams showing an original matrix constructed based on multiple network nodes according to some embodiments of the present invention. The diagrams are merely examples, which should not unduly limit the scope of the claims. One of ordinary skill in the art would recognize many variations, alternatives, and modifications.

As shown in FIG. 5(A), there are six network nodes A to F, in some embodiments. For example, an arrow represents forwarding a micro-blog. As an example, the arrow from B to A represents that the network node B forwards the micro-blog of the network node A. The value on the arrow represents the number of forwarded micro-blog. The original matrix G is constructed based on the association information of the network nodes, as shown in FIG. 5(B), according to some embodiments. For example, the corresponding weights are acquired based on the number of forwarded micro-blogs between the network nodes. Then the probability transition processing is performed on the original matrix G based on the weight to generate the sparse matrix A, according to certain embodiments.

FIG. 6 is a simplified diagram showing a sparse matrix according to one embodiment of the present invention. The diagram is merely an example, which should not unduly limit the scope of the claims. One of ordinary skill in the art would recognize many variations, alternatives, and modifications.

As shown in FIG. 6, the network node B forwards more micro-blogs of the network node A, according to some embodiments. For example, the corresponding element value is ⅓ in the obtained sparse matrix A. The weight corresponding to the contact frequency information is also considered when the sparse matrix A is obtained and the contact frequency information is included in the association information between the network nodes, according to certain embodiments.

Figure 7:
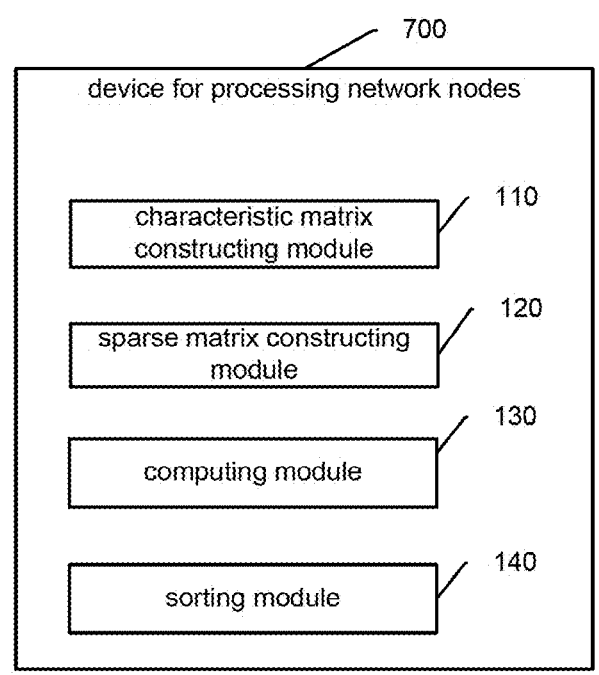
FIG. 7 is a simplified diagram showing a device for processing network nodes according to one embodiment of the present invention.

FIG. 7 is a simplified diagram showing a device for processing network nodes according to one embodiment of the present invention. The diagram is merely an example, which should not unduly limit the scope of the claims. One of ordinary skill in the art would recognize many variations, alternatives, and modifications. The device 700 includes: a characteristic matrix constructing module 110, a sparse matrix constructing module 120, a computing module 130, and a sorting module 140.

According to one embodiment, the characteristic matrix constructing module 110 is configured to detect a sorting request, acquire one or more first network nodes to be sorted corresponding to the sorting request, and construct a first characteristic matrix based on at least information associated with the first network nodes. For example, the sparse matrix constructing module 120 is configured to acquire association information between the first network nodes and construct a sparse matrix based on at least information associated with the association information between the first network nodes. As an example, the computing module 130 is configured to perform iterative multiplication on the sparse matrix and the first characteristic matrix to obtain a second characteristic matrix upon convergence. In another example, the sorting module 140 is configured to sort the first network nodes based on at least information associated with the second characteristic matrix.

According to another embodiment, the sorting request includes node types of the first network nodes to be sorted. In another example, the sorting request includes user nodes that access a certain network during a preset time period. As an example, when the sorting request is detected, the user nodes that access the network during the preset time period are counted as the first network nodes to be sorted. As another example, the preset time period corresponds to one or more days or one or more hours. As yet another example, the characteristic matrix constructing module 110 acquires the first network nodes to be sorted to construct a characteristic matrix which includes an n×1 matrix, where element values of the characteristic matrix correspond to "1/n" and n is a number of the first network nodes.

According to yet another embodiment, the sparse matrix constructing module 120 acquires association information between the first network nodes from a background database of the network. As an example, the user nodes of the micro-blog platform include various relations, such as listening relations, listened relations, and relations associated with forwarding micro-blogs and a number of forwarded micro-blogs. Then, the sparse matrix constructing module 120 constructs the sparse matrix based on the association information between the first network nodes, according to certain embodiments. For example, the sparse matrix includes an n×n matrix, and element values of the sparse matrix include relational values of the first network nodes which contain one relation.

In one embodiment, the computing module 130 multiplies the sparse matrix by the characteristic matrix to obtain a new characteristic matrix. Then the computing module 130 multiplies the sparse matrix by the new characteristic matrix until the characteristic matrix is converged to obtain the second characteristic matrix (e.g., the final characteristic matrix). As an example, characteristic matrix convergence is calculated by determining differences between element values in the new characteristic matrix and element values in a previous characteristic matrix, acquiring a sum of absolute values of the differences and then determining whether the sum of the absolute values of the differences approaches zero. As another example, if the sum of the absolute values of the differences approaches zero, the characteristic matrix has converged. Otherwise, the characteristic matrix has not converged. In another embodiment, the sorting module 140 sorts the first network nodes in a descending order based on the element values of the second characteristic matrix.

In certain embodiments, the sparse matrix and the characteristic matrix are constructed based on the first network nodes to be sorted, and iterative multiplication computing is carried out on the sparse matrix and the characteristic matrix until the characteristic matrix converges, according to some embodiments. For example, then the first network nodes are sorted based on the element values of the converged characteristic matrix. The device 700 is realized using general-purpose structured query languages, in some embodiments. For example, the sorting of network nodes of a small and medium-sized dataset may be rapidly implemented using a relational database, while the sorting of network nodes of a large or ultra-large dataset may be easily implemented using hive and hadoop distributed computing platforms.

Figure 8:
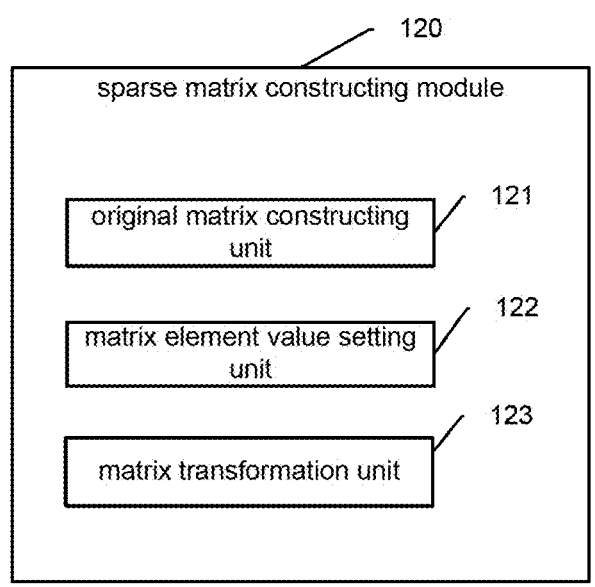
FIG. 8 is a simplified diagram showing a sparse matrix constructing module as part of the device as shown in FIG. 7 according to one embodiment of the present invention.

FIG. 8 is a simplified diagram showing a sparse matrix constructing module as part of the device as shown in FIG. 7 according to one embodiment of the present invention. The diagram is merely an example, which should not unduly limit the scope of the claims. One of ordinary skill in the art would recognize many variations, alternatives, and modifications.

According to one embodiment, the sparse matrix constructing module 120 includes: an original matrix constructing unit 121 configured to construct an original matrix based on at least information associated with the first network nodes, wherein first element values of the original matrix correspond to "0"; a matrix element value setting unit 122 configured to, in response to two second network nodes being associated according to the association information between the first network nodes, set second element values in the original matrix corresponding to the second network nodes as "1" and update the original matrix; and a matrix transformation unit 123 configured to perform probability transition processing on the updated original matrix to generate the sparse matrix.

According to another embodiment, the characteristic matrix B constructed by the characteristic matrix constructing module 110 and the sparse matrix A constructed by the sparse matrix constructing module 120 are as follows, respectively:

$$B = \begin{bmatrix} b_{11} \\ b_{21} \\ \dots \\ b_{n1} \end{bmatrix}, A = \begin{bmatrix} a_{11} & a_{12} & \dots & a_{1n} \\ a_{21} & a_{22} & \dots & a_{2n} \\ \dots & \dots & \dots & \dots \\ a_{n1} & a_{n2} & \dots & a_{nn} \end{bmatrix}$$

According to some embodiments, if $A_i$ corresponds to a set of column numbers of columns that include non-zero values associated with an $i^{th}$ row in the matrix G, D corresponds to a set of column numbers of columns that include of $C_j$ 0 in the matrix G. For example, if iterative multiplication is performed on the sparse matrix A and the characteristic matrix B, the following equation is obtained:

$$b'_{i1} = \sum_{k \in A_I} a_{ik} b_{k1} + \frac{1}{n} \sum_{j \in D} b_{j1} + \frac{1-P}{n} \left(1 - \sum_{j \in D} b_{j1} - \sum_{j \in A_I} b_{k1}\right) \quad (4)$$

According to certain embodiments, when iterative multiplication is performed on the matrix A and the matrix B, Equation 4 is partitioned in three blocks, such as $$\sum_{k \in A_I} a_{ik} b_{k1}, \frac{1}{n} \sum_{j \in D} b_{j1}, \text{and } \frac{1-P}{n} \left(1 - \sum_{j \in D} b_{j1} - \sum_{j \in A_I} b_{k1}\right),$$

which are calculated respectively and are then added. Through setting of the above sparse matrix, data can be calculated in blocks when iterative multiplication is performed on the sparse matrix A and the characteristic matrix B, and thus the calculation efficiency is improved, according to certain embodiments.

In one embodiment, the matrix transformation unit 123 is further configured to, in response to the association information between the first network nodes including contact frequency information, perform the probability transition processing on the updated original matrix G to generate the n×n sparse matrix based on at least information associated with one or more weights corresponding to the contact frequency information.

Figure 9:
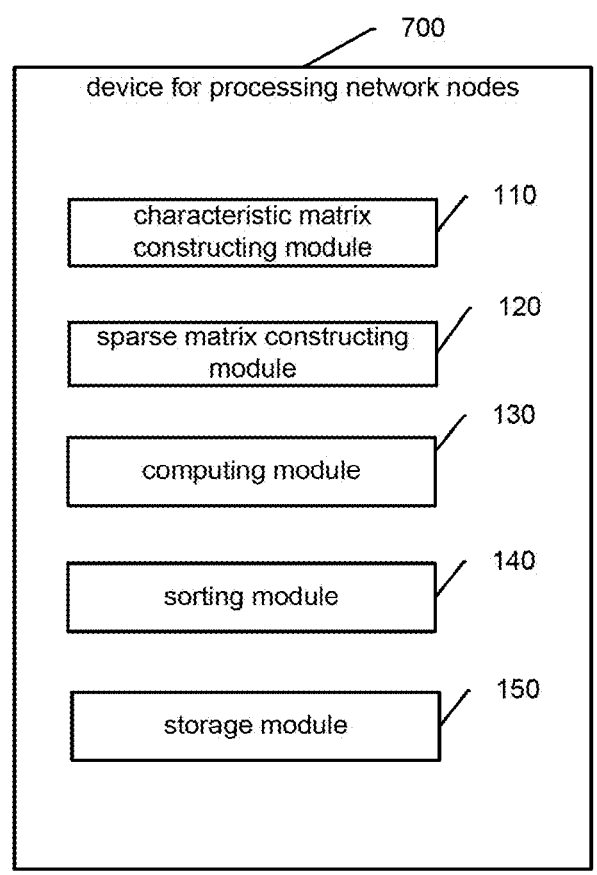
FIG. 9 is a simplified diagram showing a device for processing network nodes according to another embodiment of the present invention.

FIG. 9 is a simplified diagram showing a device for processing network nodes according to another embodiment of the present invention. The diagram is merely an example, which should not unduly limit the scope of the claims. One of ordinary skill in the art would recognize many variations, alternatives, and modifications.

According to one embodiment, the device 700 further includes: a storage module 150 configured to: store one or more first column numbers associated with one or more first columns of the original matrix, where third element values of the first columns correspond to "0"; store one or more first row numbers and one or more second column numbers associated with fourth element values of the original matrix corresponding to "1"; and store fifth element values of the sparse matrix obtained through the probability transition processing on sixth element values of the original matrix corresponding to "1".

According to certain embodiments, based on Equation 2 for generating the sparse matrix using the original matrix, when $g_{ij}=1$, $$a_{ij} = \frac{p}{c_j} + \frac{1-p}{n};$$

when $g_{ij}=0$ and $$c_j \neq 0, a_{ij} = \frac{1-p}{n};$$

when $g_{ij}=1$ and $$c_j = 0, a_{ij} = \frac{1}{n}.$$

According to some embodiments, when iterative multiplication is performed, the computing module 130 is further configured to partition the sparse matrix into three blocks of data based on at least information associated with the first row numbers, the second column numbers and the first column numbers; multiply the three blocks of data by the first characteristic matrix; and add results of the multiplication to obtain a new characteristic matrix. For example, iterative computing is performed by storing the column numbers of the columns having $C_j$ of 0, the row numbers and the column numbers of the original matrix G having element values of 1 and element values in the matrix A after probability transition that correspond to element values of 1 in the original matrix G. Not all data is required to be stored, and thus the storage space is saved, according to certain embodiments.

According to one embodiment, a method is provided for processing network nodes. For example, a sorting request is detected; one or more first network nodes to be sorted are acquired corresponding to the sorting request; a first characteristic matrix is constructed based on at least information associated with the first network nodes; association information between the first network nodes is acquired; a sparse matrix is constructed based on at least information associated with the association information between the first network nodes; iterative multiplication is performed on the sparse matrix and the first characteristic matrix to obtain a second characteristic matrix upon convergence; and the first network nodes are sorted based on at least information associated with the second characteristic matrix. For example, the method is implemented according to at least FIG. 2.

According to another embodiment, a device for processing network nodes includes: a characteristic matrix constructing module configured to detect a sorting request, acquire one or more first network nodes to be sorted corresponding to the sorting request, and construct a first characteristic matrix based on at least information associated with the first network nodes; a sparse matrix constructing module configured to acquire association information between the first network nodes and construct a sparse matrix based on at least information associated with the association information between the first network nodes; a computing module configured to perform iterative multiplication on the sparse matrix and the first characteristic matrix to obtain a second characteristic matrix upon convergence; and a sorting module configured to sort the first network nodes based on at least information associated with the second characteristic matrix. For example, the device is implemented according to at least FIG. 7 and/or FIG. 9.

According to yet another embodiment, a non-transitory computer readable storage medium includes programming instructions for processing network nodes. The programming instructions are configured to cause one or more data processors to execute certain operations. For example, a sorting request is detected; one or more first network nodes to be sorted are acquired corresponding to the sorting request; a first characteristic matrix is constructed based on at least information associated with the first network nodes; association information between the first network nodes is acquired; a sparse matrix is constructed based on at least information associated with the association information between the first network nodes; iterative multiplication is performed on the sparse matrix and the first characteristic matrix to obtain a second characteristic matrix upon convergence; and the first network nodes are sorted based on at least information associated with the second characteristic matrix. For example, the storage medium is implemented according to at least FIG. 2.

The above only describes several scenarios presented by this invention, and the description is relatively specific and detailed, yet it cannot therefore be understood as limiting the scope of this invention. It should be noted that ordinary technicians in the field may also, without deviating from the invention's conceptual premises, make a number of variations and modifications, which are all within the scope of this invention. As a result, in terms of protection, the patent claims shall prevail.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it is understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for processing network nodes, the method comprising:
    detecting a sorting request of a network platform;
    acquiring n network nodes in the network platform to be sorted corresponding to the sorting request, n being an integer greater than 1;
    constructing a first characteristic matrix based on information associated with the n network nodes, wherein the first characteristic matrix is a n×1 matrix including n elements;
    constructing an original matrix based on the information associated with the n network nodes, wherein the original matrix is a n×n matrix having n×n elements, and all element values of the n×n elements in the original matrix are "0";
    acquiring a relationship information between each of the n network nodes, wherein the relationship information is predefined by a user;
    constructing a sparse matrix based on the information associated with the relationship information between the n network nodes,
        wherein the sparse matrix is a n×n matrix, an element in the sparse matrix is represented as $g_{ij}$, $1 \leq i \leq n$, $1 \leq j \leq n$; and
        when the i-th network node and the j-th network node are related, replacing element $g_{ij}$ in the original matrix by "1" to generate the sparse matrix, comprising:
            replacing element $g_{ij}$ in the original matrix by "1" to obtain an updated original matrix; and
            performing a probability transition processing on the updated original matrix to generate the sparse matrix;
    performing an iterative multiplication on the sparse matrix and the first characteristic matrix to obtain a second characteristic matrix upon convergence, comprising:
        partitioning the sparse matrix into three blocks of data based on at least information associated with one or more first row numbers, one or more second column numbers and one or more first column numbers;
        multiplying the three blocks of data by the first characteristic matrix; and
        adding results of the multiplication to obtain the second characteristic matrix;
    sorting the n network nodes in the network platform based on information associated with the second characteristic matrix, comprising:
        storing the one or more first column numbers associated with one or more first columns of the original matrix, where first element values of the first columns correspond to "0";
        storing the one or more first row numbers and the one or more second column numbers associated with second element values of the original matrix corresponding to "1"; and
        storing third element values of the sparse matrix obtained through the probability transition processing on fourth element values of the original matrix corresponding to "1"; and
    providing and displaying a sorted result of the n network nodes in the network platform to a user.

2. The method of claim 1, wherein the performing the probability transition processing on the updated original matrix to generate the sparse matrix includes:
    in response to the relationship information between the n network nodes including a contact frequency information, performing the probability transition processing on the updated original matrix to generate the sparse matrix based on information associated with one or more weights corresponding to the contact frequency information.

3. The method of claim 1, wherein the performing the iterative multiplication on the sparse matrix and the first characteristic matrix to obtain the second characteristic matrix upon convergence, comprises:
    determining differences between element values in an intermediate characteristic matrix obtained from an iterative multiplication result and element values in the first characteristic matrix;
    acquiring a sum of absolute values of the differences;
    determining whether the intermediate characteristic is convergent by determining whether the sum of the absolute values of the differences approaches zero;
    performing the iterative multiplication on the sparse matrix and the intermediate characteristic matrix when intermediate characteristic matrix is not convergent; and
    obtaining the second characteristic matrix as the intermediate characteristic matrix when the intermediate characteristic matrix is convergent.

4. The method of claim 1, wherein the network platform includes a micro-blog platform, and the relationship information between each of the n network nodes includes a listening relation;
    when a first network node is followed by a second network node, the first network node and the second network node have the listening relation; and the element values in the original matrix correspond to the first network node and the second network node are replaced as "1".

5. The method of claim 1, wherein the network platform includes a micro-blog platform, and the relationship information between each of the n network nodes includes a micro-blog forwarding relation;
    when a first network node forwards micro-blogs of a second network node, the first network node and the second network node have the micro-blog forwarding relation; and the element values in the original matrix correspond to the first network node and the second network node are replaced as "1".

6. A device for processing network nodes, the device comprising:
- a characteristic matrix constructing module configured to detect a sorting request of a network platform, acquire n network nodes in the network platform to be sorted corresponding to the sorting request, n being an integer greater than 1, and construct a first characteristic matrix based on information associated with the n network nodes, wherein the first characteristic matrix is a n×1 matrix including n elements;
- an original matrix constructing unit configured to construct an original matrix based on the information associated with the n network nodes, wherein the original matrix is a n×n matrix having n×n elements, and all element values of the n×n elements in the original matrix are "0";
- a sparse matrix constructing module configured to acquire a relationship information between each of the n network nodes, wherein the relationship information is predefined by a user, and construct a sparse matrix based on the information associated with the relationship information between the n network nodes, comprising:
  - a matrix transformation unit configured to replace element $g_{ij}$ in the original matrix by "1" to obtain an updated original matrix; and perform a probability transition processing on the updated original matrix to generate the sparse matrix;
  - wherein the sparse matrix is a n×n matrix, an element in the sparse matrix is represented as $g_{ij}$, $1 \leq i \leq n$, $1 \leq j \leq n$ and
  - when the i-th network node and the j-th network node are related, element $g_{ij}$ in the original matrix is replaced by "1" to generate the sparse matrix;
- a computing module configured to perform iterative multiplication on the sparse matrix and the first characteristic matrix to obtain a second characteristic matrix upon convergence, wherein the computing module is configured to:
  - partition the sparse matrix into three blocks of data based on at least information associated with one or more first row numbers, one or more second column numbers and one or more first column numbers;
  - multiply the three blocks of data by the first characteristic matrix; and
  - add results of the multiplication to obtain the second characteristic matrix;
- a sorting module configured to sort the n network nodes in the network platform based on information associated with the second characteristic matrix, wherein the sorting module is configured to:
  - store one or more first column numbers associated with the one or more first columns of the original matrix, where first element values of the first columns correspond to "0";
  - store the one or more first row numbers and the one or more second column numbers associated with second element values of the original matrix corresponding to "1"; and
  - store third element values of the sparse matrix obtained through the probability transition processing on sixth element values of the original matrix corresponding to "1"; and
- a displaying module providing and displaying a sorted result of the n network nodes in the network platform to a user.

7. The device of claim 6, wherein the matrix transformation unit is further configured to, in response to the relationship information between the first network nodes including a contact frequency information, perform the probability transition processing on the updated original matrix to generate the sparse matrix based on information associated with one or more weights corresponding to the contact frequency information.

8. The device of claim 6, further comprising:
- one or more data processors; and
- a computer-readable storage medium;
- wherein one or more of the characteristic matrix constructing module, the sparse matrix constructing module, the computing module, and the sorting module are stored in the storage medium and configured to be executed by the one or more data processors.

9. The device of claim 6, wherein the computing module is further configured to
- determine differences between element values in an intermediate characteristic matrix obtained from an iterative multiplication result and element values in the first characteristic matrix;
- acquire a sum of absolute values of the differences;
- determine whether the intermediate characteristic is convergent by determining whether the sum of the absolute values of the differences approaches zero;
- perform the iterative multiplication on the sparse matrix and the intermediate characteristic matrix when intermediate characteristic matrix is not convergent; and
- obtain the second characteristic matrix as the intermediate characteristic matrix when the intermediate characteristic matrix is convergent.

10. A non-transitory computer readable storage medium comprising programming instructions for processing network nodes, the programming instructions configured to cause one or more data processors to execute operations comprising:
- detecting a sorting request of a network platform;
- acquiring n network nodes in the network platform to be sorted corresponding to the sorting request, n being an integer greater than 1;
- constructing a first characteristic matrix based on information associated with the n network nodes, wherein the first characteristic matrix is a n×1 matrix including n elements;
- constructing an original matrix based on the information associated with the n network nodes, wherein the original matrix is a n×n matrix having n×n elements, and all element values of the n×n elements in the original matrix are "0";
- acquiring a relationship information between each of the n network nodes, wherein the relationship information is predefined by a user;
- constructing a sparse matrix based on the information associated with the relationship information between the n network nodes,
  - wherein the sparse matrix is a n×n matrix, an element in the sparse matrix is represented as $g_{ij}$, $1 \leq i \leq n$, $1 \leq j \leq n$; and
  - when the i-th network node and the j-th network node are related, replacing element $g_{ij}$ in the original matrix by "1" to generate the sparse matrix, comprising:
    - replacing element $g_{ij}$ in the original matrix by "1" to obtain an updated original matrix; and performing a probability transition processing on the updated original matrix to generate the sparse matrix;

performing iterative multiplication on the sparse matrix and the first characteristic matrix to obtain a second characteristic matrix upon convergence, comprising:

partitioning the sparse matrix into three blocks of data based on at least information associated with one or more first row numbers, one or more second column numbers and one or more first column numbers;

multiplying the three blocks of data by the first characteristic matrix; and adding results of the multiplication to obtain the second characteristic matrix;

sorting the n network nodes in the network platform based on information associated with the second characteristic matrix, comprising:

storing the one or more first column numbers associated with one or more first columns of the original matrix, where first element values of the first columns correspond to "0";

storing the one or more first row numbers and the one or more second column numbers associated with second element values of the original matrix corresponding to "1"; and storing third element values of the sparse matrix obtained through the probability transition processing on fourth element values of the original matrix corresponding to "1"; and providing and displaying a sorted result of the n network nodes in the network platform to a user.

11. The non-transitory computer readable storage medium of claim 10, wherein the programming instructions are further configured to determine differences between element values in an intermediate characteristic matrix obtained from an iterative multiplication result and element values in the first characteristic matrix;

acquire a sum of absolute values of the differences;

determine whether the intermediate characteristic is convergent by determining whether the sum of the absolute values of the differences approaches zero;

perform the iterative multiplication on the sparse matrix and the intermediate characteristic matrix when intermediate characteristic matrix is not convergent; and obtain the second characteristic matrix as the intermediate characteristic matrix when the intermediate characteristic matrix is convergent.

* * * * *